United States Patent
Cai et al.

(10) Patent No.: US 9,032,483 B2
(45) Date of Patent: May 12, 2015

(54) AUTHENTICATING A COMMUNICATION DEVICE AND A USER OF THE COMMUNICATION DEVICE IN AN IMS NETWORK

(75) Inventors: Yigang Cai, Naperville, IL (US); Shiyan Hua, Lisle, IL (US)

(73) Assignee: Alcatel Lucent, Boulogne Billancourt (FR)

( * ) Notice: Subject to any disclaimer, the term of this patent is extended or adjusted under 35 U.S.C. 154(b) by 1538 days.

(21) Appl. No.: 11/694,873

(22) Filed: Mar. 30, 2007

(65) Prior Publication Data

US 2008/0244266 A1    Oct. 2, 2008

(51) Int. Cl.
  *H04L 29/06*  (2006.01)
  *H04L 9/32*  (2006.01)
  *H04L 9/08*  (2006.01)

(52) U.S. Cl.
  CPC ........ *H04L 9/3271* (2013.01); *H04L 29/06217* (2013.01); *H04L 63/083* (2013.01); *H04L 65/1016* (2013.01); *H04L 65/1073* (2013.01); *H04L 9/0844* (2013.01); *H04L 9/3226* (2013.01); *H04L 2209/80* (2013.01)

(58) Field of Classification Search
  CPC .................. H04L 29/06333; H04L 29/06217; H04L 29/06197
  USPC .......................... 713/170, 184; 380/30; 726/4
  See application file for complete search history.

(56) References Cited

U.S. PATENT DOCUMENTS

| | | | |
|---|---|---|---|
| 2002/0103898 A1* | 8/2002 | Moyer et al. .................. 709/224 |
| 2003/0190935 A1* | 10/2003 | Pinder ........................... 455/572 |
| 2004/0043756 A1* | 3/2004 | Haukka et al. ................ 455/411 |
| 2004/0153667 A1* | 8/2004 | Kastelewicz et al. ......... 713/201 |
| 2005/0259679 A1* | 11/2005 | Chowdhury et al. ......... 370/465 |
| 2006/0030320 A1* | 2/2006 | Tammi et al. .............. 455/435.2 |
| 2006/0077965 A1* | 4/2006 | Garcia-Martin et al. ..... 370/352 |
| 2006/0098624 A1* | 5/2006 | Morgan et al. ................ 370/352 |
| 2006/0212511 A1* | 9/2006 | Garcia-Martin ............. 709/203 |
| 2007/0208948 A1* | 9/2007 | Costa-Requena et al. .... 713/185 |

* cited by examiner

*Primary Examiner* — Ellen Tran
(74) *Attorney, Agent, or Firm* — Duft, Bornsen & Fettig, LLP

(57) ABSTRACT

IMS networks and methods are disclosed for authenticating a communication device and a user of the communication device. When a communication device attempts to register with an IMS network, the IMS network receives a register message from the device that includes device authentication information, such as a public or private identifier for the device. The IMS network processes the device authentication information to authenticate the communication device. The IMS network also receives user authentication information from the device, such as a password. The IMS network processes the user authentication information to authenticate the user of the device. The device and the user are both authenticated by the IMS network. Authentication of the user may also occur when originating a session or terminating a session over the IMS network with the device.

14 Claims, 8 Drawing Sheets

AUTHENTICATING A COMMUNICATION DEVICE AND A USER OF THE COMMUNICATION DEVICE IN AN IMS NETWORK

BACKGROUND OF THE INVENTION

1. Field of the Invention

The invention is related to the field of communication networks and, in particular, to authenticating a communication device in an IMS network and also authenticating a user of the communication device.

2. Statement of the Problem

One type of communication network gaining popularity is an IP Multimedia Subsystem (IMS) network. As set forth in the $3^{rd}$ Generation Partnership Project (3GPP), IMS provides a common core network having access-agnostic network architecture for converged networks. The access network between a communication device and the IMS network may be a cellular network, a WLAN (e.g., a WiFi or a WiMAX network), or another type of access network. The IMS architecture is initially defined by the 3GPP to provide multimedia services to communication devices over an Internet Protocol (IP) network, as IP networks have become the most cost savings bearer network to transmit video, voice, and data. Service providers are accepting this architecture in next generation network evolution.

Before a communication device receives service from the IMS network, the communication device attempts to register with the IMS network. To register, the communication device transmits a register message, such as a SIP REGISTER message, to the IMS network. Responsive to the register message, the IMS network attempts to authenticate the communication device. The 3GPP has defined standards to specify the rules and procedures for authenticating a communication device. For instance, the 3GPP specifications TS 33.203 and TS 33.102 describe an IMS AKA authentication method and IPsec that may be used to authenticate a communication device. The 3GPP specifications can be found at "www.3gpp.org". For the AKA authentication method, the IMS network and the communication device each store a secret key. The IMS network generates an authentication token based on the secret key, and transmits the authentication token to the communication device. The communication device authenticates the IMS network based on the secret key and the authentication token. The communication device then generates an authentication response based on the secret key and transmits the authentication response to the IMS network. The IMS network processes the authentication response to authenticate the communication device.

Through the AKA authentication method and other methods, the communication device is authenticated so that the IMS network may provide service to the communication device. When the communication device receives service, virtually any individual may use the communication device. One problem is that there is no effective way to monitor, determine, or control which individual is using the communication device. This may especially be a problem for communication devices used by public safety organizations or other public organizations. A communication device of a public organization may be shared amongst multiple authorized individuals, and it may be desirable to ensure that unauthorized users are not allowed to use these communication devices. It may also be desirable to limit usage of a public communication device to a selected number of authorized individuals.

SUMMARY OF THE SOLUTION

Embodiments of the invention solve the above and other related problems by authenticating a communication device in an IMS network and also authenticating a user of the communication device. The authentication may take place upon registration, when initiating a session, when terminating a session, or at another time. By authenticating both the communication device and the user, the IMS network can effectively monitor and control which users are authorized to use the communication device. This functionality is especially advantageous for public safety organizations or other public organizations that have multiple shared communication devices. An organization may define which users are authorized to use a communication device, and then the IMS network is able to control use of the communication device by authenticating each user of the communication device, such as through a password.

One embodiment of the invention comprises a method of operating an IMS network to register a communication device. The method includes receiving a register message from the communication device that includes device authentication information (e.g., a private identifier or a public identifier for the communication device), and processing the device authentication information from the register message to authenticate the communication device for registration of the communication device with the IMS network. The method further comprises receiving user authentication information (e.g., a password) from a user of the communication device, and processing the user authentication information to authenticate the user of the communication device. According to this method, both the communication device and the user of the device are authenticated in the IMS network during the registration process.

Another embodiment of the invention comprises a method of operating an IMS network to authenticate a communication device that is originating a session over the IMS network. The method includes receiving a session initiation message from the communication device to originate a session with another communication device. The method further includes transmitting a challenge message to the communication device for user authentication information responsive to receiving the session initiation message. The method further includes receiving the user authentication information from the communication device in response to the challenge message, and processing the user, authentication information to authenticate the user of the communication device for originating the session. According to this embodiment, the IMS network authenticates the user of the communication device before a session can be originated over the IMS network.

Another embodiment of the invention comprises a method of operating an IMS network to authenticate a first communication device that is being invited to accept or setup a terminating session over the IMS network. The method includes receiving a session initiation message from a second communication device to originate a session with the first communication device. The method further includes transmitting a challenge message to the first communication device for user authentication information responsive to receiving the session initiation message. The method further includes receiving the user authentication information from the first communication device in response to the challenge message, and processing the user authentication information to authenticate the user of the first communication device for terminating the session. According to this embodiment, the IMS network authenticates the user of the first communication device before a session can be terminated over the IMS network.

Another embodiment of the invention comprises a method of operating a communication device to communicate over an IMS network. The method includes generating a register message in order to register the communication device with the IMS network, including device authentication information in the register message, and transmitting the register message to the IMS network to authenticate the communication device for registration with the IMS network. The method further includes identifying user authentication information for a user of the communication device, and transmitting the user authentication information to the IMS network to authenticate the user of the communication device.

The invention may include other exemplary embodiments described below.

DESCRIPTION OF THE DRAWINGS

The same reference number represents the same element or same type of element on all drawings.

DETAILED DESCRIPTION OF THE INVENTION

Figure 1:
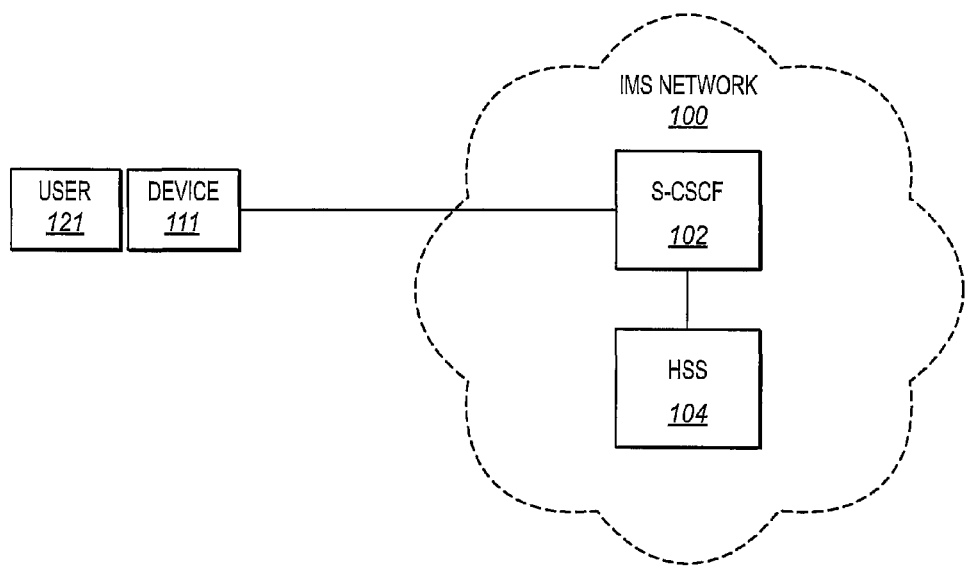
FIG. 1 illustrates an IMS network in the prior art.
Figure 2:
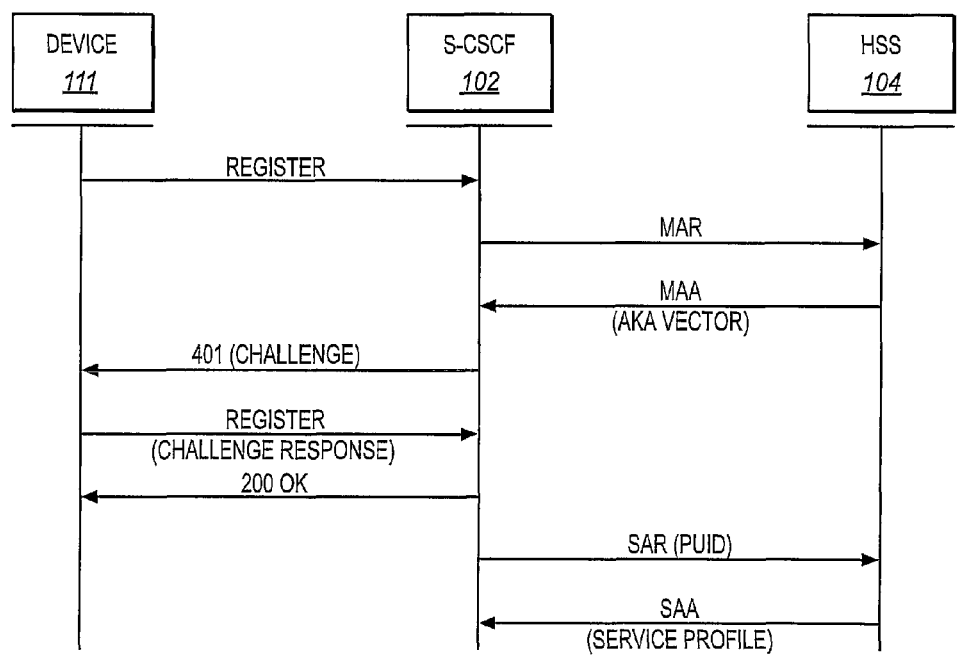
FIG. 2 is a message diagram illustrating a registration of a communication device with an IMS network in the prior art.

FIGS. 1-2 illustrate registration of a communication device with an IMS network 100 in the prior art. A traditional registration is shown in order to more clearly show the inventive aspects of the embodiments provided in FIGS. 3-14 below. FIG. 1 illustrates an IMS network 100 in the prior art. IMS network 100 includes a serving-call session control function (CSCF) 102 and a home subscriber server (HSS) 104. S-CSCF 102 provides session control in IMS network 100, such as registration of devices and session setup/teardown. In this embodiment, S-CSCF 102 is adapted to provide session control for a communication device 111 of a user 121. Device 111 comprises any wireline or wireless device adapted to communicate with IMS network 100. HSS 104 comprises any database or database system that stores subscriber information or service profiles for IMS network 100.

FIG. 2 is a message diagram illustrating a registration of device 111 with IMS network 100 in the prior art. The message diagram illustrates SIP and DIAMETER messaging used within IMS network 100. To begin, device 111 generates a SIP REGISTER message and transmits the REGISTER message to IMS network 100 in order to register with IMS network 100. The REGISTER message includes a private identifier (PRID) and a public identifier (PUID) for device 111. One example of a PRID is a directory number for device 111. Examples of a PUID include an IP address and a directory number for device 111. S-CSCF 102 receives the REGISTER message, and generates an associated Diameter Multimedia Authentication Request (MAR) message to continue the process of registering device 111. S-CSCF 102 includes the PRID and the PUID in the MAR message, and transmits the MAR message to HSS 104. HSS 104 processes the MAR message to generate an AKA vector based on the AKA authentication method. HSS 104 then formats a Diameter Multimedia Authentication Answer (MAA) message in response to the MAR message, includes the AKA vector in the MAA message, and transmits the MAA message to S-CSCF 102.

Responsive to receiving the MAA message, S-CSCF 102 transmits a SIP 401 message to device 111 to challenge device 111 for an authentication check. Device 111 receives the 401 message, and calculates an authentication response. Device 111 then formats another SIP REGISTER message and transmits the REGISTER message back to S-CSCF 102. Responsive to receiving the REGISTER message, S-CSCF 102 processes the authentication response in relation to the authentication vector to determine whether device 111 is authenticated. If device 111 is authenticated, then S-CSCF 102 formats a SIP 200 OK message and transmits the 200 OK message to device 111. The 200 OK message from S-CSCF 102 indicates to device 111 whether or not device 111 is registered with IMS network 100.

Responsive to S-CSCF 102 determining that device 111 is authenticated, S-CSCF 102 transmits a Diameter Server Assignment Request (SAR) message to HSS 104 to retrieve the service profile for device 111. Responsive to the SAR message, HSS 104 identifies the service profile for device 111, based on the PRID or PUID for device 111, and transmits a Diameter Server Assignment Answer (SAA) message to S-CSCF 102. The SAA message includes the service profile for device 111. At this point, device 111 is registered with IMS network 100 and is ready to initiate or terminate sessions over IMS network 100.

FIGS. 3-14 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 3:
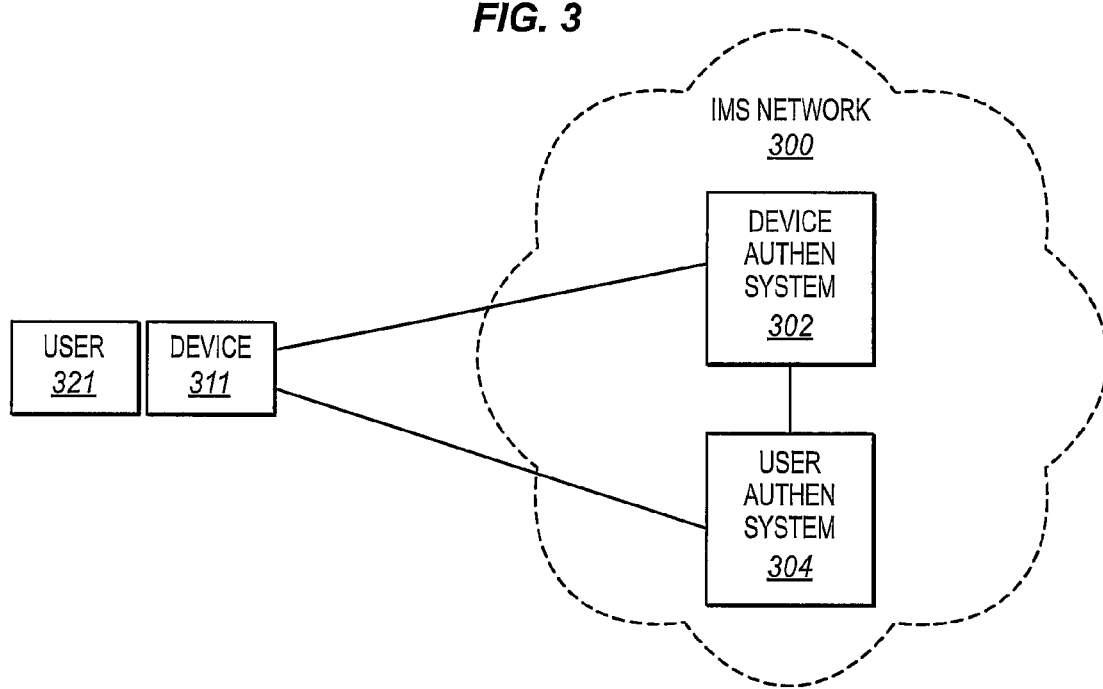
FIG. 3 illustrates an IMS network in an exemplary embodiment of the invention.

FIG. 3 illustrates an IMS network 300 in an exemplary embodiment of the invention. IMS network 300 includes a device authentication system 302 and a user authentication system 304. Device authentication system 302 comprises any system, server, or function adapted to authenticate a communication device when the communication device registers with IMS network 300. User authentication system 304 comprises any system, server, or function adapted to authenticate a user of the communication device for registering, originating a session, and/or terminating a session. Device authentication system 302 and/or user authentication system 304 may be implemented in a serving-call session control system (S-CSCF), a home subscriber server (HSS), or another node in IMS network 300, although the nodes are not illustrated in FIG. 3. For instance, device authentication system 302 and user authentication system 304 may be implemented in an S-CSCF. In another instance, device authentication system 302 may be implemented in an HSS and user authentication system 304 may be implemented in an S-CSCF.

IMS network 300 is adapted to provide communication service to a communication device 311 being operated by a user 321. Device 311 may comprise a wireline device, or may comprise a wireless device adapted to communicate with IMS network 300 through the appropriate wireless access network. The wireless access network may comprise a WiFi network, a WiMAX network, or another type of WLAN using protocols such as 802.11b, 802.11g, or Bluetooth. The wireless access network may alternatively comprise a cellular network, such as a CDMA or a GSM network.

In FIG. 3, assume that user 321 wants to use device 311 for communication over IMS network 300. Device 311 is programmed to transmit the appropriate register message to IMS network 300 in order to register with IMS network 300 to receive communication service. For instance, device 311 may be programmed to transmit a SIP REGISTER message to IMS network 300 in order to register with IMS network 300.

Figure 4:
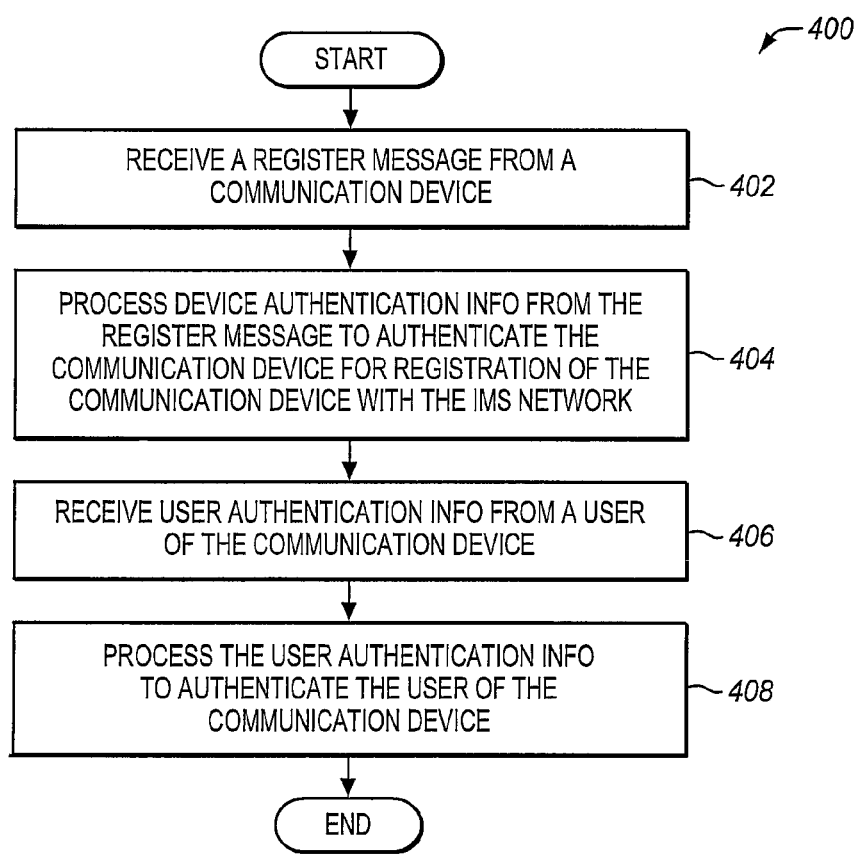
FIG. 4 is a flow chart illustrating a method of operating an IMS network in an exemplary embodiment of the invention.

FIG. 4 is a flow chart illustrating a method 400 of operating IMS network 300 in an exemplary embodiment of the invention. The steps of method 400 will be described with reference to IMS network 300 in FIG. 3. The steps of the flow chart in FIG. 4 are not all inclusive and may include other steps not shown.

In step 402 of method 400, device authentication system 302 receives the register message from device 311. The register message includes device authentication information that is used to authenticate device 311 in IMS network 300. Device authentication information comprises any code, key, data, or other information used by IMS network 300 to authenticate a device. For instance, the device authentication information may include a private identifier (PRID) for device 311 (e.g., a directory number), may comprise a public identifier (PUID) for device 311, or may comprise another type of information. The register message referred to in step 402 may be the first and original register message sent by device 311 to IMS network 300. Alternatively, device 311 may transmit an original register message to IMS network 300, receive a challenge message from IMS network 300, and transmit the register message from step 402 to IMS network 300 responsive to the challenge message from IMS network 300.

In step 404, device authentication system 302 processes the device authentication information from the register message to authenticate device 311 for registration of device 311 with IMS network 300. Device authentication system 302 may authenticate device 311 in a variety of ways using the device authentication information. For instance, device authentication system 302 may use an AKA authentication method to authenticate device 311. Device authentication system 302 may alternatively use other methods to authenticate device 311.

In step 406, user authentication system 304 receives user authentication information from user 321 of device 311. User authentication system 304 may receive the user authentication information in the register message from device 311 or may receive the user authentication information in subsequent messages from device 311, such as in response to a challenge message from IMS network 300. User authentication information comprises any code, key, data, or other information used by IMS network 300 to authenticate a user of a device as opposed to the device itself. One example of user authentication information comprises a password designated by user 321. In step 408, user authentication system 304 processes the user authentication information to authenticate user 321 of device 311.

In an example of authenticating user 321, assume that the device authentication information includes a public identifier (PUID) for device 311 and the user authentication information includes a password. User authentication system 304 may store a plurality of public identifiers for a plurality of devices and also store passwords corresponding with the public identifiers, such as in a table or other data structure that maps public identifiers with passwords. For instance, user authentication system 304 may store one or more passwords that correspond with the PUID for device 311. When user authentication system 304 receives the password from user 321, user authentication system 304 may identify the PUID for device 311. User authentication system 304 may also obtain the password or passwords that correspond with the PUID of device 311. User authentication system 304 may then compare the password provided by user 321 with the passwords that are stored for the PUID of device 311. If the password provided by user 321 matches one of the passwords stored for the PUID, then user 321 may be authenticated as an authorized user of device 311.

Whereas other IMS networks authenticate a communication device that registers with the network, IMS network 300 advantageously authenticates device 311 and user 321. By authenticating both device 311 and user 321, device 311 may be shared by multiple other users (not shown) and IMS network 300 can monitor or control which users are authorized to use device 311. If IMS network 300 only authenticated device 311, then any user with access to device 311 could use device 311 to initiate sessions over IMS network 300. However, because IMS network 300 authenticates user 321 in addition to device 311, IMS network 300 can effectively control which users are authorized to use device 311. This is especially valuable in public safety organizations or other public organizations where devices are shared among many individuals.

Authentication may take place upon registration of device 311 with IMS network 300 as described above. Authentication may additionally or alternatively take place when device 311 originates a session over IMS network 300 and/or when device 311 terminates a session over IMS network 300. Terminating a session as provided herein means attempting to establish a session as requested or originated by another party or device, much like answering a session as opposed to initiating a session.

Assume for example that device 311 attempts to originate a session over IMS network 300 with another device (not shown in FIG. 3). To originate the session, device 311 transmits the appropriate session initiation message to IMS network 300. One example of a session initiation message is a SIP INVITE message.

Figure 5:
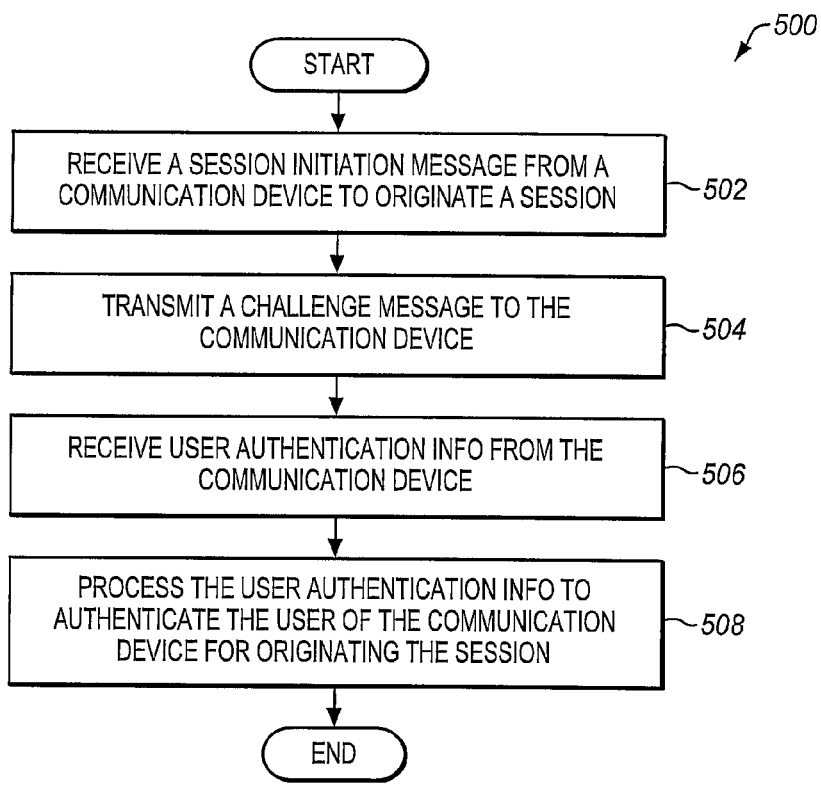
FIG. 5 is a flow chart illustrating a method of operating an IMS network to authenticate a communication device originating a session in an exemplary embodiment of the invention.

FIG. 5 is a flow chart illustrating a method 500 of operating IMS network 300 to authenticate a communication device originating a session in an exemplary embodiment of the invention. The steps of method 500 will be described with reference to IMS network 300 in FIG. 3. The steps of the flow chart in FIG. 5 are not all inclusive and may include other steps not shown.

In step 502 of method 500, user authentication system 304 receives the session initiation message from device 311. Responsive to receiving the session initiation message, user authentication system 304 transmits a challenge message to device 311 for user authentication information in step 504. Device 311 then responds with user authentication information, such as a password. User authentication system 304 receives the user authentication information from device 311 in step 506. In step 508, user authentication system 304 processes the user authentication information to authenticate user 321 of device 311 for originating the session.

As a result of this functionality, before user 321 can originate a session over IMS network 300, user 321 is first authenticated. User 321 may have already been authenticated in the registration process as described in FIG. 4, but IMS network 300 may also authenticate user 321 before a session can be originated. To avoid having user 321 enter the user authentication information each time he/she wants to originate a session, user 321 may program the user authentication information into device 311. When IMS network 300 transmits the challenge message to device 311, device 311 may automatically transmit the user authentication information to user authentication system 304 in order to authenticate user 321.

Assume in another example that another device (not shown in FIG. 3) attempts to originate a session over IMS network 300 that is terminated by device 311. To originate the session, the other device transmits the appropriate session initiation message to IMS network 300.

Figure 6:
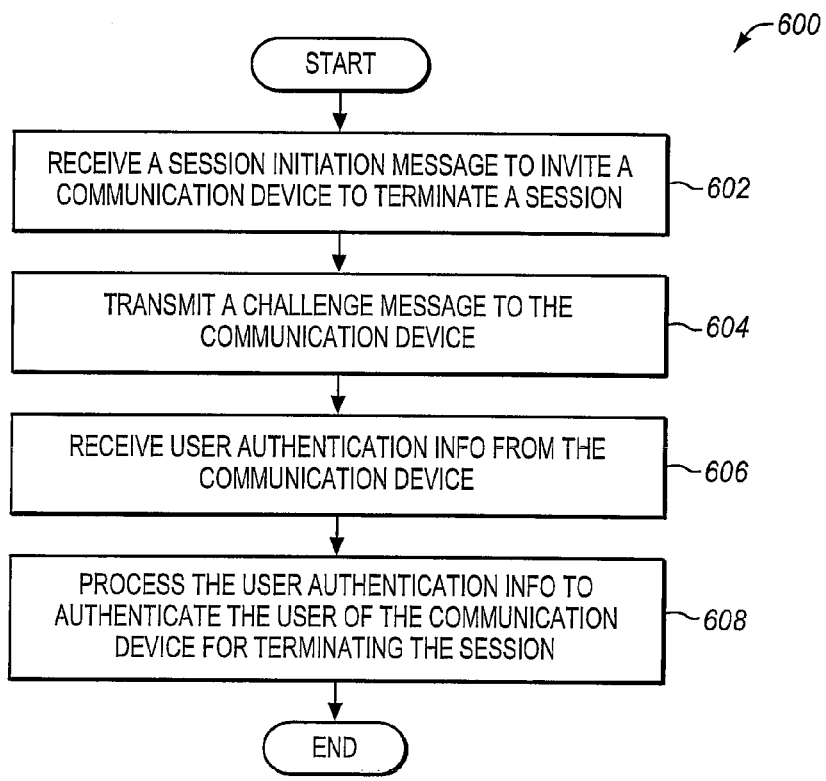
FIG. 6 is a flow chart illustrating a method of operating an IMS network to authenticate a communication device terminating a session in an exemplary embodiment of the invention.

FIG. 6 is a flow chart illustrating a method 600 of operating IMS network 300 to authenticate a communication device terminating a session in an exemplary embodiment of the invention. The steps of method 600 will be described with reference to IMS network 300 in FIG. 3. The steps of the flow chart in FIG. 6 are not all inclusive and may include other steps not shown.

In step 602 of method 600, user authentication system 304 receives the session initiation message from the other device. Responsive to receiving the session initiation message, user authentication system 304 transmits a challenge message to device 311 for user authentication information in step 604. Device 311 then responds with user authentication information, such as a password. User authentication system 304 receives the user authentication information from device 311 in step 606. In step 608, user authentication system 304 processes the user authentication information to authenticate user 321 of device 311 for terminating the session.

As a result of this functionality, before user 321 can terminate a session over IMS network 300, user 321 is first authenticated. User 321 may have already been authenticated in the registration process as described in FIG. 4, but IMS network 300 may also authenticate user 321 before a session can be terminated. As before, to avoid having user 321 enter the user authentication information each time he/she wants to terminate a session, user 321 may program the user authentication information into device 311. When IMS network 300 transmits the challenge message to device 311, device 311 may automatically transmit the user authentication information to user authentication system 304 in order to authenticate user 321.

Figure 7:
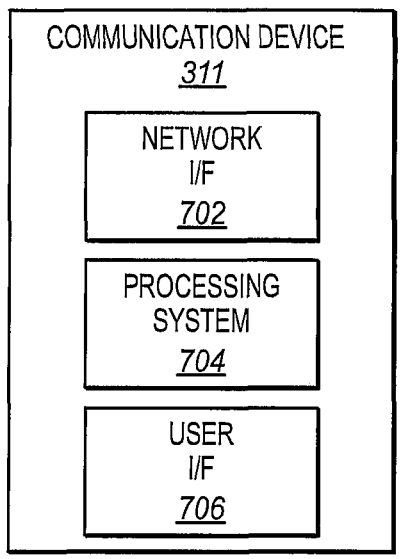
FIG. 7 illustrates a communication device in an exemplary embodiment.

FIGS. 7-10 illustrate an exemplary embodiment of device 311 and flow charts illustrating exemplary methods of operating device 311. FIG. 7 illustrates device 311 in an exemplary embodiment. Device 311 comprises a network interface 702, a processing system 704, and a user interface 706. Network interface 702 comprises any components or systems adapted to communicate with IMS network 300 and/or an access network of IMS network 300. Network interface 702 may comprise a wireline interface or a wireless interface. Processing system 704 comprises a processor or group of inter-operational processors adapted to operate according to a set of instructions. The instructions may be stored on a removable card or chip, such as a SIM card. Processing system 704 is adapted to store device authentication information for authenticating device 311 with IMS network 300, such as a PUID and/or a PRID for device 311. Processing system 704 is also adapted to store user authentication information for authenticating user 321 of device 311 with IMS network 300, such as a password designated by user 321. User interface 706 comprises any components or systems adapted to receive input from a user and/or convey information to the user, such as a keypad, a display, a pointing device, etc.

Figure 8:
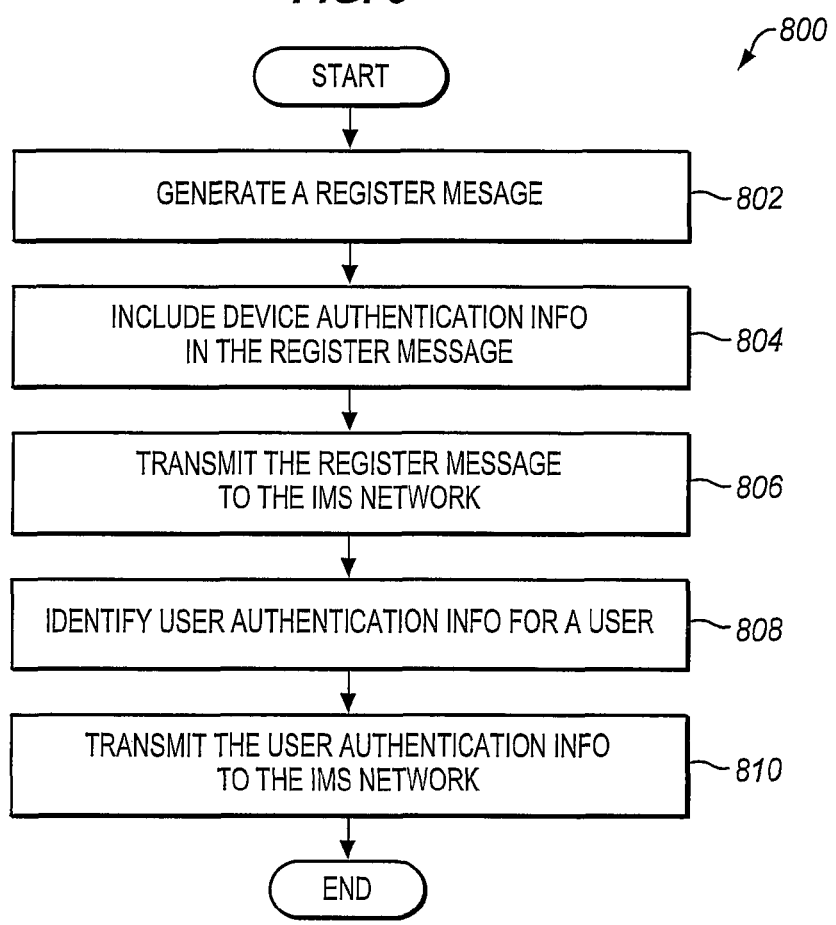
FIG. 8 is a flow chart illustrating a method of registering a communication device with an IMS network in an exemplary embodiment of the invention.

FIG. 8 is a flow chart illustrating a method 800 of registering device 311 with IMS network 300 in an exemplary embodiment of the invention. The steps of method 800 will be described with reference to device 311 in FIG. 7 and IMS network 300 in FIG. 3. The steps of the flow chart in FIG. 8 are not all inclusive and may include other steps not shown.

In step 802 of method 800, processing system 704 generates a register message in order to register device 311 with IMS network 300. One example of the register message comprises a SIP REGISTER message. In step 804, processing system 704 includes or otherwise inserts the device authentication information in the register message. In step 806, processing system 704 transmits the register message, along with the device authentication information, to IMS network 300 through network interface 702 to authenticate device 311 for registration with IMS network 300. The register message referred to in steps 802-806 may be the first and original register message sent by device 311 to IMS network 300. Alternatively, device 311 may transmit an original register message to IMS network 300, receive a challenge message from IMS network 300, and transmit the register message from steps 802-806 to IMS network 300 responsive to the challenge message from IMS network 300.

In step 808, processing system 704 identifies user authentication information for user 321. To identify the user authentication information, processing system 704 may query user 321 through user interface 706 for the user authentication information, and receive user input from user 321 through user interface 706 providing the user authentication information. Processing system 704 may also retrieve the information from memory that was previously entered by user 321 or otherwise programmed into device 311. In step 810, processing system 704 transmits the user authentication information to IMS network 300 through network interface 702 to authenticate user 321 of device 311 for registration with IMS network 300. Processing system 704 may transmit the user authentication information in the register message of steps 802-806. Alternatively, processing system 704 may transmit the user authentication information responsive to a challenge from IMS network 300.

Figure 9:
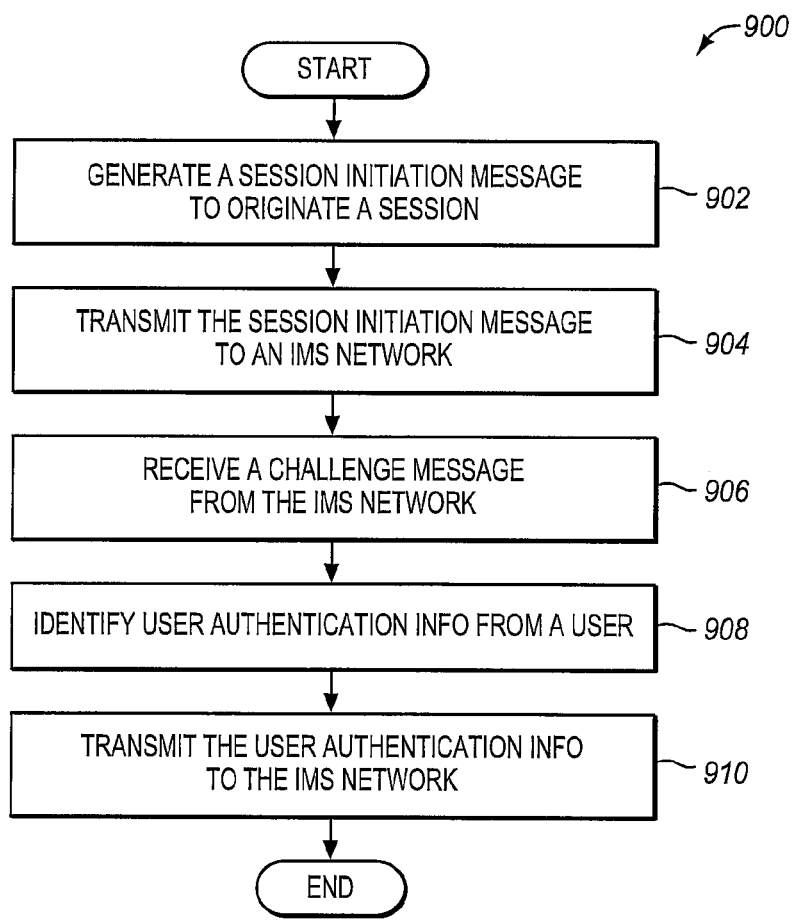
FIG. 9 is a flow chart illustrating a method of originating a session through a communication device in an exemplary embodiment of the invention.

FIG. 9 is a flow chart illustrating a method 900 of originating a session through device 311 in an exemplary embodiment of the invention. The steps of method 900 will be described with reference to device 311 in FIG. 7 and IMS network 300 in FIG. 3. The steps of the flow chart in FIG. 9 are not all inclusive and may include other steps not shown.

In step 902 of method 900, processing system 704 generates a session initiation message to originate a session over IMS network 300 with another device. One example of the session initiation message comprises a SIP INVITE message. In step 904, processing system 704 transmits the session initiation message to IMS network 300 through network interface 702. In step 906, network interface 702 receives a challenge message from IMS network 300. The challenge message from IMS network 300 is to authenticate user 321 of device 311. Responsive to the challenge message, processing system 704 identifies user authentication information for user 321 in step 908. Again, processing system 704 may query user 321 through user interface 706 for the user authentication information. Alternatively, processing system 704 may already store the user authentication information as entered by user 321 during the registration process or entered at another time. In step 910, processing system 704 transmits the user authentication information to IMS network 300 through network interface 702 to authenticate user 321 of device 311 for originating the session.

Figure 10:
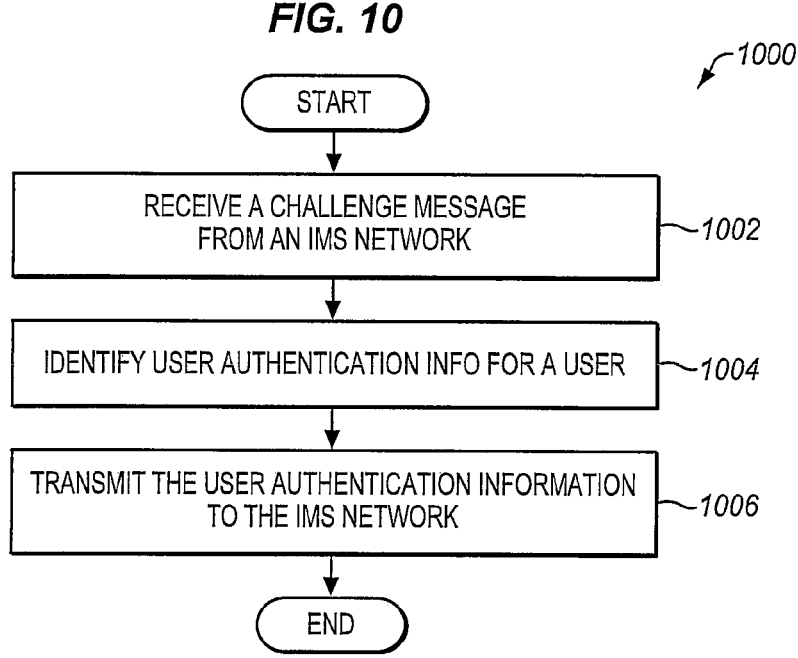
FIG. 10 is a flow chart illustrating a method of terminating a session through a communication device in an exemplary embodiment of the invention.

FIG. 10 is a flow chart illustrating a method 1000 of terminating a session through device 311 in an exemplary embodiment of the invention. The steps of method 1000 will be described with reference to device 311 in FIG. 7 and IMS network 300 in FIG. 3. The steps of the flow chart in FIG. 10 are not all inclusive and may include other steps not shown.

In step 1002 of method 1000, network interface 702 receives a challenge message from IMS network 300. IMS network 300 received a session initiation message from another device, and is attempting to terminate the session to device 311. Before session termination is allowed, IMS network 300 transmits the challenge message to device 311. Responsive to receiving the challenge message, processing system 704 identifies user authentication information for user 321 in step 1004. Again, processing system 704 may query user 321 through user interface 706 for the user authentication information. Alternatively, processing system 704 may already store the user authentication information as entered by user 321 during the registration process or entered at another time. In step 1006, processing system 704 transmits the user authentication information to IMS network 300 through network interface 702 to authenticate user 321 of device 311 for terminating the session. If user 321 is authenticated, then network interface 702 receives the session initiation message from IMS network 300. Processing system 704 may then process the session initiation message in order to terminate the session.

Example

Figure 11:
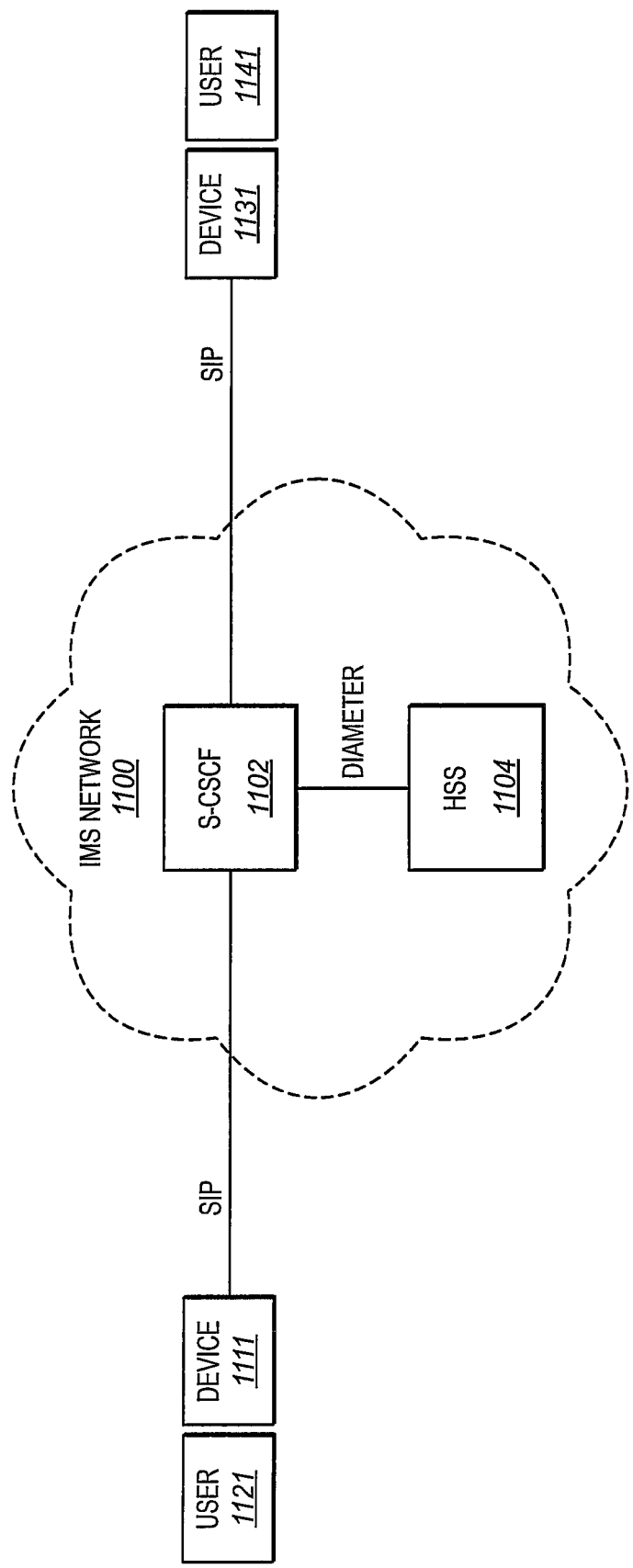
FIG. 11 illustrates another IMS network in an exemplary embodiment of the invention.

FIGS. 11-14 illustrate an example of operating an IMS network to authenticate both a communication device and a user of the communication device. FIG. 11 illustrates an IMS network 1100 in an exemplary embodiment of the invention. IMS network 1100 includes a serving-call session control function (S-CSCF) 1102 and a home subscriber server (HSS) 1104. IMS network 1100 may include other nodes that are not illustrated in FIG. 11 for the sake of brevity. IMS network 1100 is adapted to provide communication service to a communication device 1111 being operated by a user 1121 through S-CSCF 1102. IMS network 1100 is also adapted to provide communication service to a communication device 1131 being operated by a user 1141. Device 1131 may be served by S-CSCF 1102 or another CSCF not shown in FIG. 11. Devices 1111 and 1131 may comprise wireline devices, or may comprise wireless devices adapted to communicate with IMS network 1100 through the appropriate wireless access network.

In FIG. 11, assume that device 1111 belongs to a public safety organization or another public organization and that it may be shared amongst multiple users (such as employees) of the organization. Further assume that of the multiple users, a particular user (user 1121) wants to use device 1111 for communication over IMS network 1100. Device 1111 first has to register with IMS network 1100 to receive service.

Figure 12:
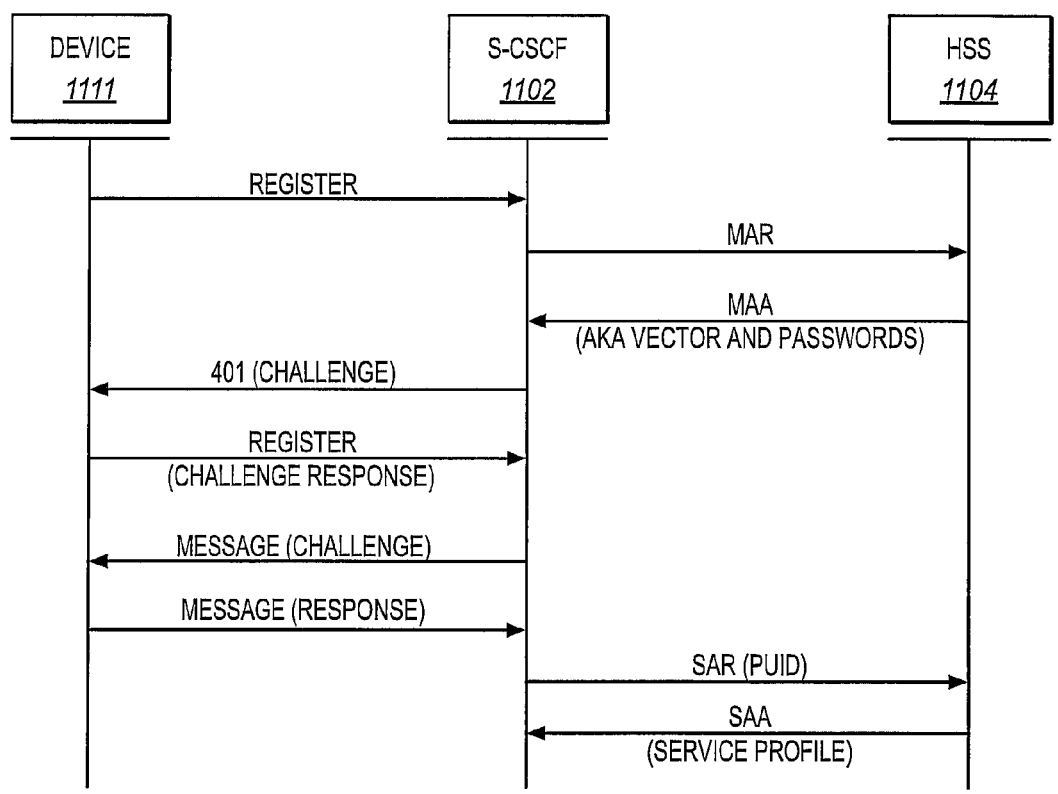
FIG. 12 is a message diagram illustrating messaging used to register a communication device with an IMS network in an exemplary embodiment of the invention.

FIG. 12 is a message diagram illustrating messaging used to register device 1111 with IMS network 1100 in an exemplary embodiment of the invention. The message diagram illustrates SIP and DIAMETER messaging used within IMS network 1100. To begin, device 1111 generates a SIP REGISTER message and transmits the REGISTER message to IMS network 1100 in order to register with IMS network 1100. The REGISTER message includes a private identifier (PRID) and a public identifier (PUID) for device 1111. One example of a PRID is a directory number for device 1111. One example of a PUID is an email address or another identifier for user 1121. S-CSCF 1102 receives the REGISTER message, and generates an associated Diameter Multimedia Authentication Request (MAR) message to continue the process of registering device 1111. S-CSCF 1102 includes the PRID and the PUID in the MAR message, and transmits the MAR message to HSS 1104.

HSS 1104 processes the PRID in the MAR message to generate an AKA vector based on the AKA authentication method. HSS 1104 also processes the PUID to identify a password associated with the PUID. HSS 1104 stores a data structure that maps PUID's with passwords. For instance, employee1 of the public organization may define a PUID and a corresponding password, employee2 of the public organization may define a PUID and a corresponding password, employee3 of the public organization may define a PUID and a corresponding password, etc. HSS 1104 may store the PUID and corresponding passwords for these and other employees. After identifying the password, HSS 1104 calculates an encrypted version of the password. For instance, HSS 1104 may use the MD5 message digest algorithm to calculate the MD5(A1) message digest for the password. HSS 1104 may concatenate the PUID, digest MD5 network realm data, and the password identified for the PUID. HSS 1104 may then calculate the MD5(A1) message digest by applying an MD5 message digest algorithm.

HSS 1104 then generates a Diameter Multimedia Authentication Answer (MAA) message in response to the MAR message, and includes the AKA vector in the MAA message such as in the SIP-Authenticate AVP of the MAA. HSS 1104 also includes the encrypted password in the MAA message, such as in the SIP-Authenticate AVP of the MAA. The SIP Authenticate AVP may appear twice in the MAA such that one SIP-Auth-Data-Item includes the AKA vector and another SIP-Auth-Data-Item includes the encrypted password.

Responsive to receiving the MAA message, S-CSCF 1102 transmits a SIP 401 message to device 1111 to challenge device 1111 for an authentication check. Device 1111 receives the 401 message, and calculates the authentication response. Device 1111 then generates another SIP REGISTER message and transmits the REGISTER message back to S-CSCF 1102. Responsive to receiving the REGISTER message, S-CSCF 1102 processes the authentication response in relation to the authentication vector to determine whether device 1111 is authenticated. If device 1111 is authenticated, then S-CSCF 1102 stores the encrypted password for user 1121.

S-CSCF 1102 then challenges device 1111 and user 1121 again for a password. For the challenge, S-CSCF 1102 transmits a SIP MESSAGE to device 1111. Responsive to the SIP MESSAGE, device 1111 identifies the password for user 1121. To identify the password, device 1111 may query user 1121 for the password, and receive user input from user 1121 providing the password. Device 1111 may alternatively retrieve the password from memory that was previously entered by user 1121 or otherwise programmed into device 1111. Device 1111 then generates a SIP MESSAGE response, includes the password in the SIP MESSAGE response, and transmits the SIP MESSAGE response to S-CSCF 1102.

Responsive to the SIP MESSAGE response, S-CSCF 1102 compares the password provided by user 1121 with the stored password from HSS 1104. If the passwords match, then user 1121 is authenticated as an authorized user of device 1111. If the passwords do not match, then S-CSCF 1102 does not register user 1121 or device 1111.

If user 1121 is authenticated, then S-CSCF 1102 transmits a Diameter Server Assignment Request (SAR) message to HSS 1104 to retrieve the service profile for user 1121. Responsive to the SAR message, HSS 1104 identifies the service profile for user 1121 based on the PUID for user 1121, and transmits a Diameter Server Assignment Answer (SAA) message to S-CSCF 1102. The SAA message includes the service profile for user 1121.

At this point, device 1111 and user 1121 are registered with IMS network 1100 and are ready to initiate or terminate sessions over IMS network 1100. Just as IMS network 1100 challenged user 1121 for a password upon registration, IMS network 1100 may also challenge user 1121 for a password before user 1121 can originate a session over IMS network 1100 or terminate a session over IMS network 1100.

Figure 13:
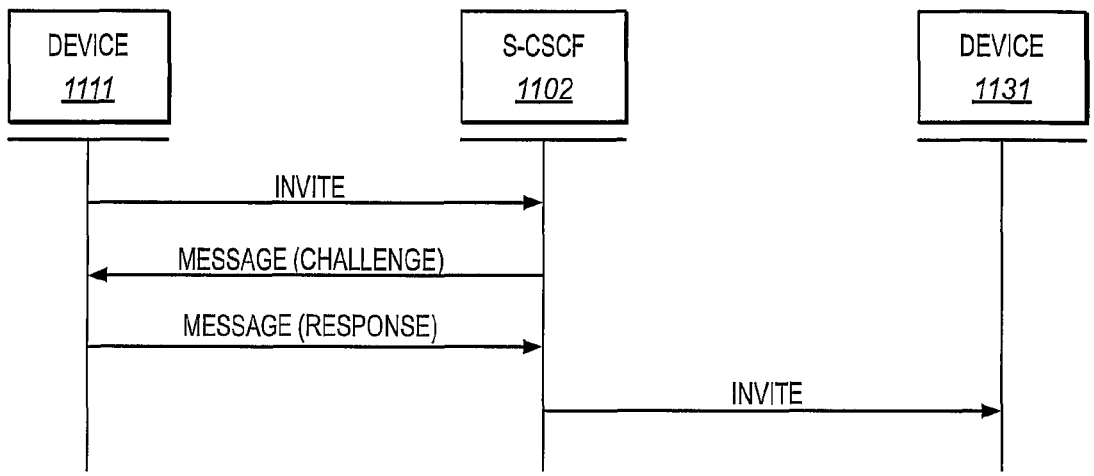
FIG. 13 is a message diagram illustrating messaging used to originate a session over an IMS network in an exemplary embodiment of the invention.

Assume that user 1121, through device 1111, wants to originate a session with device 1131. FIG. 13 is a message diagram illustrating messaging used to originate a session over IMS network 1100 in an exemplary embodiment of the invention. To begin, device 1111 transmits a SIP INVITE message to IMS network 1100 to originate the session that is received by S-CSCF 1102. Responsive to the INVITE message, S-CSCF 1102 challenges device 1111 and user 1121 again for a password. For the challenge, S-CSCF 1102 transmits a SIP MESSAGE to device 1111. Responsive to the SIP MESSAGE, device 1111 identifies the password for user 1121. To identify the password, device 1111 may query user 1121 for the password, and receive user input from user 1121 providing the password. Device 1111 may alternatively retrieve the password from memory that was previously entered by user 1121 or otherwise programmed into device 1111 so that user 1121 does not have to manually enter the password each time he/she wants to originate a session. Device 1111 then generates a SIP MESSAGE response, includes the password in the SIP MESSAGE response, and transmits the SIP MESSAGE response to S-CSCF 1102.

Responsive to the SIP MESSAGE response, S-CSCF 1102 compares the password provided by user 1121 with the stored password from HSS 1104. If the passwords match, then user 1121 is authenticated as an authorized user of device 1111. S-CSCF 1102 then transmits the SIP INVITE message to device 1131 to originate the session. If the passwords do not match, then S-CSCF 1102 does not allow device 1111 to originate the session.

Figure 14:
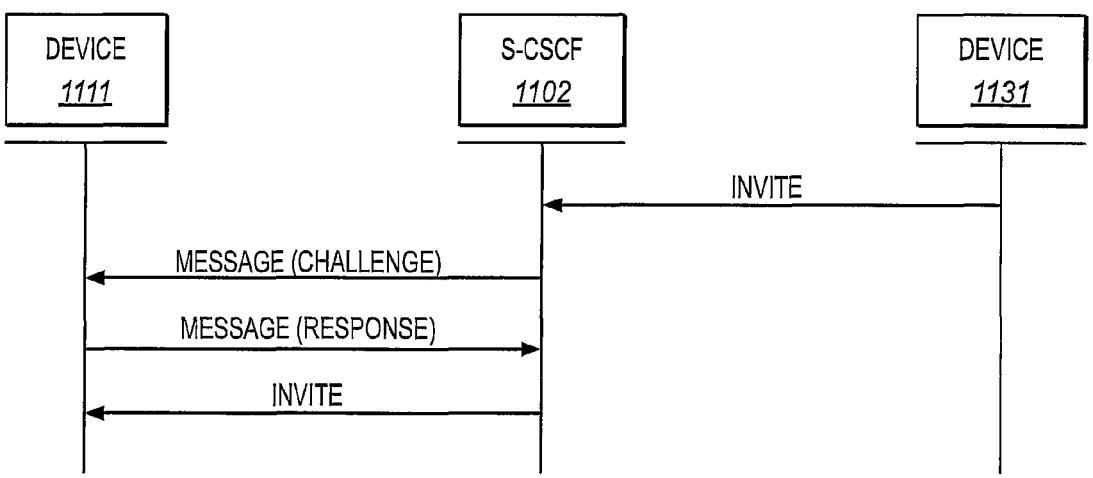
FIG. 14 is a message diagram illustrating messaging used to terminate a session over an IMS network in an exemplary embodiment of the invention.

Assume that user 1141, through device 1131, wants to originate a session with device 1111. In this example, device 1111 is terminating the session instead of originating the session. FIG. 14 is a message diagram illustrating messaging used to terminate a session over IMS network 1100 in an exemplary embodiment of the invention. To begin, device 1131 transmits a SIP INVITE message to IMS network 1100 to originate the session that is received by S-CSCF 1102. Responsive to the INVITE message, S-CSCF 1102 challenges device 1111 and user 1121 again for a password. For the challenge, S-CSCF 1102 transmits a SIP MESSAGE to device 1111. Responsive to the SIP MESSAGE, device 1111 identifies the password for user 1121. Device 1111 then generates a SIP MESSAGE response, includes the password in the SIP MESSAGE response, and transmits the SIP MESSAGE response to S-CSCF 1102.

Responsive to the SIP MESSAGE response, S-CSCF 1102 compares the password provided by user 1121 with the stored password from HSS 1104. If the passwords match, then user 1121 is authenticated as an authorized user of device 1111. S-CSCF 1102 then transmits the SIP INVITE message to device 1111 to terminate the session. If the passwords do not match, then S-CSCF 1102 does not allow device 1111 to terminate the session.

As is evident in the above example, device 1111 may be shared by multiple authorized users without worry of an unauthorized individual being able to use device 1111. In addition to authenticating device 1111 itself, IMS network 1100 authenticates the user 1121 of device 1111 to determine if the user is an authorized user. If so, then user 1121 may register with IMS network 1100 and originate or terminate sessions using device 1111. If not, user 1121 would not be able to register with IMS network 1100, or originate or terminate sessions over IMS network 1100. IMS network 1100 can thus effectively control which users are allowed to use which communication devices, which is especially helpful for public organizations having shared communication devices.

Although specific embodiments were described herein, the scope of the invention is not limited to those specific embodiments. The scope of the invention is defined by the following claims and any equivalents thereof.

We claim:

1. A system comprising:
   a Serving-Call Session Control Function (S-CSCF) of an IP Multimedia Subsystem (IMS) network;
   the S-CSCF is configured to receive a first message from a device to register the device with the IMS network, wherein the first message includes a Public Identifier (PUID) for the device;
   the S-CSCF is configured to transmit a second message to a Home Subscriber Server (HSS) of the IMS network with the PUID for the device, to receive a third message from the HSS with passwords that are mapped to the PUID, and to transmit a fourth message to the device to challenge the device for an authentication check;
   the S-CSCF is configured to receive a fifth message from the device with an authentication response to authenticate the device;
   the S-CSCF is configured to transmit a sixth message to the device to challenge a user of the device for a password, to receive a seventh message from the device that includes the password input by the user, to compare the password input by the user with the passwords mapped to the PUID, to authenticate the user as an authorized user of the device only when the password input by the user matches the passwords mapped to the PUID, and to register both the user and the device when the user is authenticated.

2. The system of claim 1 wherein:
the password is stored in a memory of the device as previously input by the user.

3. The system of claim 1 wherein:
the first message comprises a SIP REGISTER to register the device with the IMS network;
the fourth message comprises a SIP 401 response to challenge the device for the authentication check; and
the sixth message comprises a SIP MESSAGE to challenge the user for the password.

4. The system of claim 1 wherein:
the S-CSCF is configured to receive an eighth message from the device to originate a session over the IMS network, to transmit a ninth message to the device to challenge the user of the device for the password, to receive a tenth message from the device that includes the password input by the user, to compare the password input by the user with the passwords mapped to the PUID, to authenticate the user as an authorized user of the device only when the password input by the user matches the passwords mapped to the PUID, and to originate the session from the device when the user is authenticated.

5. The system of claim 4 wherein:
the eighth message comprises a SIP INVITE to originate the session over the IMS network; and
the ninth message comprises a SIP MESSAGE to challenge the user for the password.

6. The system of claim 1 wherein:
the S-CSCF is configured to receive an eighth message from another device to invite the device to terminate a session over the IMS network, to transmit a ninth message to the device to challenge the user of the device for the password, to receive a tenth message from the device that includes the password input by the user, to compare the password input by the user with the passwords mapped to the PUID, to authenticate the user as an authorized user of the device only when the password input by the user matches the passwords mapped to the PUID, and to terminate the session to the device when the user is authenticated.

7. The system of claim 6 wherein:
the eighth message comprises a SIP INVITE to invite the device to terminate the session over the IMS network; and
the ninth message comprises a SIP MESSAGE to challenge the user for the password.

8. A method operable in a Serving-Call Session Control Function (S-CSCF) of an IP Multimedia Subsystem (IMS) network, the method comprising:
receiving, in the S-CSCF, a first message from a device to register the device with the IMS network, wherein the first message includes a Public Identifier (PUID) for the device;
transmitting a second message from the S-CSCF to a Home Subscriber Server (HSS) of the IMS network with the PUID for the device;
receiving a third message in the S-CSCF from the HSS with passwords that are mapped to the PUID;
transmitting a fourth message from the S-CSCF to the device to challenge the device for an authentication check;
receiving a fifth message in the S-CSCF from the device with an authentication response to authenticate the device;
transmitting a sixth message from the S-CSCF to the device to challenge a user of the device for a password;
receiving a seventh message in the S-CSCF from the device that includes the password input by the user;
comparing, in the S-CSCF, the password input by the user with the passwords mapped to the PUID;
authenticating the user as an authorized user of the device only when the password input by the user matches the passwords mapped to the PUID; and
registering both the user and the device when the user is authenticated.

9. The method of claim 8 wherein:
the password is stored in a memory of the device as previously input by the user.

10. The method of claim 8 wherein:
the first message comprises a SIP REGISTER to register the device with the IMS network;
the fourth message comprises a SIP 401 response to challenge the device for the authentication check; and
the sixth message comprises a SIP MESSAGE to challenge the user for the password.

11. The method of claim 8 further comprising:
receiving an eighth message in the S-CSCF from the device to originate a session over the IMS network;
transmitting a ninth message from the S-CSCF to the device to challenge the user of the device for the password;
receiving a tenth message in the S-CSCF from the device that includes the password input by the user;
comparing the password input by the user with the passwords mapped to the PUID;
authenticating the user as an authorized user of the device only when the password input by the user matches the passwords mapped to the PUID; and
originating the session from the device when the user is authenticated.

12. The method of claim 11 wherein:
the eighth message comprises a SIP INVITE to originate the session over the IMS network; and
the ninth message comprises a SIP MESSAGE to challenge the user for the password.

13. The method of claim 8 further comprising:
receiving an eighth message in the S-CSCF from another device to invite the device to terminate a session over the IMS network;
transmitting a ninth message from the S-CSCF to the device to challenge the user of the device for the password;
receiving a tenth message in the S-CSCF from the device that includes the password input by the user;
comparing the password input by the user with the passwords mapped to the PUID;
authenticating the user as an authorized user of the device only when the password input by the user matches the passwords mapped to the PUID; and
terminating the session to the device when the user is authenticated.

14. The method of claim 13 wherein:
the eighth message comprises a SIP INVITE to invite the device to terminate the session over the IMS network; and the ninth message comprises a SIP MESSAGE to challenge the user for the password.

\* \* \* \* \*